United States Patent
Seech et al.

[11] Patent Number: 6,083,394
[45] Date of Patent: *Jul. 4, 2000

[54] COMPOSITION AND METHOD FOR DEHALOGENATION AND DEGRADATION OF HALOGENATED ORGANIC CONTAMINANTS

[75] Inventors: Alan George Seech, Mississauga; James Ewart Cairns, Toronto; Igor Jiri Marvan, Mississauga, all of Canada

[73] Assignee: W.R. Grace & Co. of Canada Ltd., Mississauga, Canada

[*] Notice: This patent is subject to a terminal disclaimer.

[21] Appl. No.: 08/385,009

[22] Filed: Feb. 7, 1995

Related U.S. Application Data

[63] Continuation of application No. 08/126,343, Sep. 24, 1993, Pat. No. 5,411,664.

[30] Foreign Application Priority Data

Sep. 28, 1992 [CA] Canada ................................. 2079282

[51] Int. Cl.⁷ ...................................................... C02F 1/70
[52] U.S. Cl. .......................... 210/602; 210/610; 210/616; 210/631; 210/747; 210/757; 210/908; 134/39
[58] Field of Search ..................................... 210/601, 602, 210/610, 611, 615–617, 631, 679, 747, 757, 908, 909; 134/39, 40, 42

[56] References Cited

U.S. PATENT DOCUMENTS

| | | | |
|---|---|---|---|
| 3,737,384 | 6/1973 | Sweeny et al. | 210/754 |
| 4,219,419 | 8/1980 | Sweeny | 210/754 |
| 4,427,548 | 1/1984 | Quick, Jr. | 210/617 |
| 4,535,061 | 8/1985 | Chakrabarty et al. | 210/601 |
| 4,891,320 | 1/1990 | Aust et al. | 210/611 |
| 5,028,543 | 7/1991 | Finch et al. | 210/909 |

*Primary Examiner*—David A. Simmons
*Assistant Examiner*—Chester T. Barry
*Attorney, Agent, or Firm*—Robert A. Maggio

[57] ABSTRACT

A method of creating an environment which promotes dehalogenation and/or degradation of halogenated organic chemical contaminants in water, sediment, or soil by adding a combination of fibrous organic matter and certain multivalent metal particles to the water, sediment or soil.

19 Claims, No Drawings

COMPOSITION AND METHOD FOR DEHALOGENATION AND DEGRADATION OF HALOGENATED ORGANIC CONTAMINANTS

This is a continuation of application Ser. No. 08/126,343, filed Sep. 24, 1993, now U.S. Pat. No. 5,411,664.

FIELD OF THE INVENTION

This invention relates to the removal of halogenated organic chemical contaminants from soils, waters, or sediments by promoting reductive dehalogenation thereby making the dehalogenated contaminants more readily degradable by microorganisms. More specifically, this invention relates to the use of fibrous organic matter together with certain multi-valent metal particles, which, when added to soil or water containing halogenated organic chemical contaminants, creates an anaerobic, reductive environment which promotes dehalogenation of the halogenated organic chemical contaminants and thereby enhances the degradation of the chemical contaminants.

BACKGROUND OF THE INVENTION

Many halogenated organic chemical contaminants present in the environment are known to be highly resistant to degradation. Current research has demonstrated that their persistence in the environment may be overcome by initially subjecting these contaminants to dehalogenation reactions. Once dehalogenated, the organic contaminants are usually degraded easily, generally by aerobic microbial processes.

Dehalogenation of organic contaminants in microbial ecosystems occurs both by enzymatic and non-enzymatic mechanisms. An example of a non-enzymatic mechanism is the reductive dechlorination of DDT (1,1,1-trichloro-2,2-bis (p-chlorophenyl)ethane) by an iron porphyrin redox system wherein the DDT is reacted with a reduced iron porphorin such as hematin. Most enzymatic reactions involve whole microbial cells such as bacteria, fungi and algae. Enzymatic reactions are usually more specific than non-enzymatic reactions but their activity is destroyed by harsh conditions such as exposure to high temperatures.

Microbial activity can assist dehalogenation of organic contaminants either directly by enzyme production, or indirectly, by maintaining the reducing conditions of the environment and thereby enhancing the inorganic and biochemical mechanisms.

SUMMARY OF THE INVENTION

It is an object of this invention to provide a method for dehalogenating and degrading halogenated organic chemical contaminants in the environment.

It is another object of this invention to provide a novel composition which is useful for dehalogenating and degrading halogenated organic chemical contaminants in the environment.

In accordance with the present invention, there has been provided a novel method of dehalogenating and decomposing halogenated organic chemical contaminants in water, sediment or soil comprising adding to the water, sediment or soil a mixture of fibrous organic matter which is capable of supporting bacterial or fungal growth and certain multi-valent metal particles in amounts effective to provide a negative redox potential which results in conditions which promote reductive dehalogenation and degradation of the halogenated organic chemical contaminants.

Also provided in accordance with the present invention is a novel composition useful for dehalogenating and degrading halogenated organic chemical contaminants comprising a mixture of fibrous organic matter which is capable of supporting bacterial or fungal growth and certain multi-valent metal particles in a weight ratio of metal:organic matter in the range of from 1:1 to 1:500,000 respectively.

DETAILED DESCRIPTION

It has now been discovered that a combination of fibrous organic matter which is capable of supporting bacterial or fungal growth and certain multi-valent metal particles, when added to soil, water or sediment which is contaminated with halogenated organic chemicals, can provide an environment which has a stable negative redox potential, i.e., a reducing environment, which is conducive to the reductive dehalogenation and subsequent enhanced degradation or decomposition of the halogenated organic contaminants.

In accordance with the principles of this invention, there has been provided a method for dehalogenating halogenated organic chemical contaminants which are present in soil, water or sediment, thereby enhancing the decomposition or decay of the contaminants. The method of this invention comprises mixing fibrous organic matter, together with certain multi-valent metal particles into the soil, water or sediment to be decontaminated. This mixture is then incubated under suitable temperature and moisture conditions which are conducive to anaerobic microbiological growth, i.e., generally at a temperature between 0° to 60° C. preferably between 10° C. and 40° C. and most preferably between 25° C. to 37° C., and at a moisture content for soil and sediment samples, generally greater than 50% mositure content and preferably at 100% of the water holding capacity of the soil or sediment.

Microorganisms must be present in the mixture, and are generally indigenous to both the organic matter and the contaminated soil, water or sediment being treated. Alternatively, additional microorganisms may optionally be added to the contaminated soil, water or sediment prior to introduction of organic matter or before, during, and after the subsequent incubation period. During the incubation period the combination of organic matter and multi-valent metal particles provide an enhanced reducing environment wherein the halogenated organic chemical contaminants undergo reductive dehalogenation to yield non-halogenated organic compounds which are easily degraded or decomposed by microorganisms which are naturally present in the soil, water or sediment.

For purposes of explanation and not limitation, it is believed that the fibrous organic matter provides nutrients for aerobic and facultatively anaerobic microorganisms. The growth of these microorganisms consumes oxygen which promotes anaerobic conditions which lowers the redox potential of the environment. The redox potential may also be lowered by reducing compounds such as sulfur-containing amino acids and the like which may be present in the organic matter and also by the reducing power of the multi-valent metal particles. This environment promotes the growth of anaerobic microorganisms whose activity lowers and maintains a strong negative redox potential i.e., creates strong reducing conditions which are conducive to reductive dehalogenation reactions. The resulting system contains a wide spectrum of inorganic, biochemical, and enzymatic redox systems; some or all of which promote the reductive dehalogenation of the halogenated organic contaminants. After dehalogenation, the organic contaminants tend to be more readily degradable, and will thus rapidly decompose or decay by natural processes in the environment, particularly if aerobic conditions are subsequently maintained.

The present invention is of general applicability with regard to the precise nature of the fibrous organic matter, provided of course that it is fibrous, that it can be readily mixed with the contaminated soil, sediment or water and that it is capable of supporting bacterial or fungal growth. It is considered an important feature of this invention that the organic matter be fibrous. It has now been discovered that the use of fibrous organic matter permits absorption of the halogenated organic chemical contaminants into the fibrous structure which enhances the extent of the contaminant removal from the environment. Suitable fibrous organic matter is generally derived from plant matter such as crops, crop residue, bushes or trees including their byproducts (e.g. sawdust), grass and weeds and algae. Depending on the bioavailable nutrient content i.e., the level of soluble sugars, carbohydrates and/or amino acids; the physical structure of the organic matter, i.e., surface area/particle size and/or the chemical properties (i.e., its carbon:nitrogen ratio which is generally less than 50:1, preferably less than 25:1 and is most preferably around 10:1), it may be beneficial to blend different sources of plant matter together. Plant matter which is high in nitrogen content e.g., leguminous plant matter is particularly preferred. Alternatively, the plant matter may be supplemented with nitrogenous material such as amines, nitrates, etc., including but not limited to ammonium nitrate, urea, calcium nitrate, and the like, and mixtures thereof. The plant matter may also be supplemented with other fibrous or non-fibrous organic matter such as simple carbon sources including carbohydrates, such as sugars, organic acids such as lactic acids, and the like and mixtures thereof; as well as complex organic matter including sewage sludge, potato processing waste, molasses, spent distiller grains, and spent coffee grounds and the like and mixtures thereof. The fibrous organic matter is preferably cut or ground into small particles in order to increase the exposed surface area and thereby enhance its contact with the soil components and absorption of the halogenated organic chemical contaminants. The particle size of the fibrous organic matter is not, per se, critical to the invention provided of course that it can be readily mixed with the contaminated soil and is generally in a thickness range of from 0.001 mm to 25 mm. The fibrous plant matter particles may be applied to the contaminated environment at a dosage rate of 0.5% to 50% w/w dry soil, dry sediment or water.

Suitable multi-valent metal particles for use in this invention include those multi-valent metals which are capable of being oxidized and reduced back and forth under normal environmental conditions and which have average particle diameters ranging from 0.001 mm to 5 mm. Iron, magnesium and mixtures thereof are most preferred metals due to their moderately low toxicity and good reducing power. These metals may be applied at 50 mg to 5000 mg per kg of water or kg of dry weight of soil or sediment preferably 250 mg to 2500 mg per kg of water or kg of dry weight of soil or sediment. Other preferred multi-valent metals for use in this invention include zinc, copper, cobalt, nickel, and mixtures thereof. However, due to the relatively high toxicity of these metals, they are generally added at a lower dosage level than iron or magnesium, generally in the range of 1 to 1,000 mg per kg of water or kg of dry weight of soil or sediment, preferably 10 to 100 mg per kg of water or kg of dry weight of soil or sediment.

Mixtures of metal particles may also be used advantageously in this invention. For example, some redox systems such as those based on porphyrins are complexed with iron while others, such as corins are complexed with cobalt. Thus, it may be advantageous to treat some contaminated environments with a combination of multi-valent metals such as, e.g., a mixture of iron and cobalt.

Microorganisms which are known to dechlorinate and/or degrade halogenated organic chemical contaminants including their byproducts may optionally be added to further enhance the degradation reactions. Effective concentrations of organisms range from $10^2$ to $10^9$ cells per kg water or kg of dry weight of soil or sediment.

Another embodiment of the present invention is to pre-incubate a mixture of organic matter and metal particles, and, if desired, microorganisms, to enhance the initial reducing power of the mixture and provide higher microbial content and then introduce this mixture into the contaminated environment. This embodiment is particularly advantageous for treating contaminated environments in which the contaminants are toxic to microorganisms by increasing the content of desired microbial species prior to introduction into the contaminated environment.

It may be convenient to treat the contaminated water, sediment or soil with a mixture of fibrous organic matter which is capable of supporting bacterial or fungal growth and multi-valent metal particles. Thus, in accordance with this aspect of the invention, there has been provided a composition which is useful for dehalogenating and/or degrading halogenated organic chemical contaminants in water, soil or sediment comprising a mixture of fibrous organic matter which is capable of supporting bacterial or fungal growth and multi-valent metal particles wherein the weight ratio of metal particles to organic matter ranges from 1:1 to 1:500,000 respectively. When the multivalent metal particles comprise iron, magnesium or mixtures thereof, the weight range of metal particles to organic matter is preferably in the range 1:1 to 1:10,000 respectively, and when the multivalent metal particles comprise zinc, copper, cobalt, nickel or mixtures thereof, the weight range of metal particles to organic matter is preferably in the range 1:10 to 1:500,000 respectively.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

Both microbial and biochemical reductive dehalogenation processes require the establishment of a reducing environment. An experiment was designed to show the ability of the different soil treatments to produce and maintain a negative redox potential. Soil treatments were thoroughly mixed into dried, sieved soil which had been brought to 100% water-holding capacity. The results in the table below demonstrate that the combination of iron and organic matter maintain a lower negative redox potential for a longer duration than iron alone or organic matter alone. The combination also permits less treatment to be used.

Effectiveness of Fibrous Organic Matter and Multi-Valent Metals in Establishing and Maintaining Reducing Environments in Soil

| TREATMENT | REDOX POTENTIAL (mV) | |
| --- | --- | --- |
| | 1 day incubation at 25° C. | 62 days incubation at 25° C. |
| None | 333 | 393 |
| Iron (2.5 gm/kg soil) | −414 | 263 |
| NLA (100 gm/kg soil) | −464 | 108 |
| NLA + Iron (50 g/kg + 0.25 g/kg) | −488 | −58 |
| NLA + Iron (50 g/kg + 2.5 g/kg) | −545 | −135 |
| NLA + Iron (100 g/kg + 0.25 g/kg) | −494 | −102 |
| NLA + Iron (100 g/kg + 2.5 g/kg) | −517 | −87 |
| LA (50 g/kg soil) | −395 | −223 |
| LA + Iron (25 g/kg + 0.25 g/kg) | −512 | −540 |
| LA + Iron (25 g/kg + 2.5 g/kg) | −520 | −339 |
| LA + Iron (50 g/kg + 0.25 g/kg) | −484 | −371 |
| LA + Iron (50 g/kg + 2.5 g/kg) | −521 | −272 |

NLA=non-leguminous additive (wheat straw)
LA=leguminous additive (alfalfa)

EXAMPLE 2

The effectiveness of different treatments on the dehalogenation and degradation of soil samples contaminated with chlorinated pesticides was evaluated. The treatments were thoroughly mixed into dried sieved soil samples which had been brought to 100% water-holding capacity. The table below shows the results after approximately one month of incubation at ambient laboratory temperatures.

Amount of Pesticides Remaining After One Month of Treatment

| Chlorinated Pesticide | Control | Iron Only | LA Only | LA & Iron | NLA Only | NLA & Iron |
| --- | --- | --- | --- | --- | --- | --- |
| Dieldrin | 100% | 75% | 48% | 34% | 48% | 33% |
| Endrin | 100% | 100% | 64% | 51% | 73% | 28% |

Control = No treatment
LA = leguminous plant additive (alfalfa), added at 5% (W/W, dry soil)
NLA = non-leguminous plant additive (wheat straw), added at 10% (W/W, dry soil)
Iron was added at 2.5 g/kg soil with NLA amendment and at 0.25 g/kg soil with LA amendment. The initial concentration of Dieldrin was 11.6 ppm while initial level of Endrin was 7.69 ppm.

A negative redox potential was measured in the treated solid indicating anaerobic conditions and a reducing environment. The first step in degradation under anaerobic conditions is usually reductive dechlorination. Since the loss of pesticides could not be attributed to complete mineralization, as indicated by experiments using $^{14}C$ labelled pesticides, the original pesticide compounds must have been substantially degraded.

EXAMPLE 3

The procedure in Example 1 was repeated, except soil samples from a different site which contained DDT were tested. The addition of 10% (W/W) of NLA resulted in a 61% loss of DDT while the supplemental addition of 2.5 g iron per kg soil to the amendment resulted in an 86% loss of DDT.

What is claimed is:

1. A method for facilitating the decontamination, from organic contaminants, of water, sediment, or soil containing environments, whereby said organic contaminants are subject to degradation or decomposition under strong reducing conditions, comprising providing to at least one of said environments a combination of (a) fibrous organic matter which is capable of supporting bacterial or fungal growth and (b) multivalent metal particles, in a manner and under conditions sufficient to lower the redox potential of said environment relative to the absence of (a) and (b) therein, and subsequently allowing said organic contaminants to degrade or decompose, thereby facilitating the decontamination of said environment.

2. The method according to claim 1 wherein the metal is selected from the group consisting of iron, magnesium and mixtures thereof.

3. The method according to claim 2 wherein the metal particles are added in a dosage range from 50 mg to 5000 mg per kg of water or dry weight of soil or sediment.

4. The method according to claim 2 wherein the metal is selected from the group consisting of zinc, copper, cobalt, nickel, and mixtures thereof.

5. The method according to claim 1 wherein the metal particles are added in a dosage range from 250 to 2500 mg per kg of water or of dry weight soil or sediment.

6. The method according to claim 5 wherein the metal particles are added in a dosage range from 1 to 1,000 mg per kg of water or of dry weight soil or sediment.

7. The method according to claim 5 wherein the metal particles are added in a dosage range from 10 to 100 mg per kg of water or of dry weight soil or sediment.

8. The method according to claim 1 wherein the environment is treated with a composition comprising a mixture of fibrous organic matter and multi-valent metal particles wherein the weight ratio of metal:organic matter in the mixture ranges from 1:1 to 1:500,000, respectively.

9. The method according to claim 1 wherein the size of the metal particles ranges from 0.001 mm to 5 mm.

10. The method according to claim 1 wherein the fibrous organic matter is plant matter selected from the group consisting of agricultural crops, crop residues, bushes, trees, grass, weeds, algae and mixtures thereof.

11. The method according to claim 10 wherein the plant matter is added at a dosage range from 0.5% to 50% w/w soil, sediment, or water.

12. The method according to claim 10 wherein the plant matter is ground or cut into particles having a thickness ranging from 0.001 mm to 25 mm.

13. The method according to claim 10 wherein the plant matter comprises a mixture and wherein individual components of the mixture comprise from 0.1% to 99.9% of the mixture.

14. The method according to claim 10 wherein plant matter is supplemented with an organic supplement selected from the group consisting of carbohydrate, organic acid, sewage sludge, potato processing waste, spent distiller grain, and spent coffee ground or with a nitrogenous material selected from the group consisting of amine, nitrate, and mixtures thereof.

15. The method according to claim 14 wherein percent of organic supplement ranges from 0.1 to 49% of the total organic mixture.

16. A method according to claim 1 wherein the soil, water, or sediment is further treated with supplemental microorganisms.

17. A method according to claim 16 wherein the supplemental microorganism concentration is in the range from $10^2$ to $10^9$ cells per kg water or dry weight of soil or sediment.

18. A method according to claim 1 wherein the organic matter and multi-valent metals are mixed and incubated before addition to the environment.

19. A method comprising
   (a) providing (i) fibrous organic matter which is capable of supporting bacterial or fungal growth and (ii) multivalent metal particles to a water, sediment or soil containing environment which comprises organic contaminants which are subject to degradation or decomposition under strong reducing conditions,
   (b) further providing (i) and (ii) in a manner and under conditions sufficient to lower the redox potential of said environment relative to the absence of said (i) and (ii),
   (c) and subsequently allowing said organic contaminants to degrade or decompose, thereby facilitating the decontamination of said environment.

* * * * *